March 28, 1950 P. B. BENNER 2,501,837
CABLE LAYING SHEAVE
Filed Dec. 14, 1945 3 Sheets-Sheet 3

INVENTOR.
Paul B. Benner
BY
Charles M. Fryer
ATTORNEY.

Patented Mar. 28, 1950

2,501,837

UNITED STATES PATENT OFFICE 2,501,837

CABLE LAYING SHEAVE

Paul B. Benner, Peoria, Ill., assignor to Caterpillar Tractor Co., San Leandro, Calif., a corporation of California Application December 14, 1945, Serial No. 634,991

4 Claims. (Cl. 254—190)

The present invention relates to cable laying sheaves and particularly to the construction and arrangement of sheaves employed for laying or directing cables as they are wound upon cable laying drums.

The invention is particularly adapted to use in connection with control cables extending between a draft implement, such as a tractor, and a drawn implement, such as an earth scraper or the like, and will be disclosed herein in connection with such use for purposes of illustration. It will be apparent from the disclosure, however, that the invention is not limited to the combination of equipment herein shown but is capable of general application in many fields.

It is conventional practice where cable is wound upon a drum or the like to provide a sheave for guiding the cable toward the drum. The sheave is usually pivotally supported in a manner to permit it to follow the direction of the cable as it progresses in winding from side to side of the drum, thus facilitating the orderly arrangement or laying of the individual turns of the cable on the surface of the drum.

This invention is concerned with such cable laying sheaves where a pair of closely spaced cables are both wound upon drums which are also closely spaced so that sheaves of conventional design are incapable of operation without interfering with each other.

It is, therefore, an object of the present invention to provide a construction and arrangement for cable laying sheaves which will enable two sheaves to be mounted for operation in conjunction with closely spaced cables and winding drums. Further and more specific objects and advantages of the invention are made apparent in the following specification where a typical application of the invention is disclosed in detail.

Figure 1:
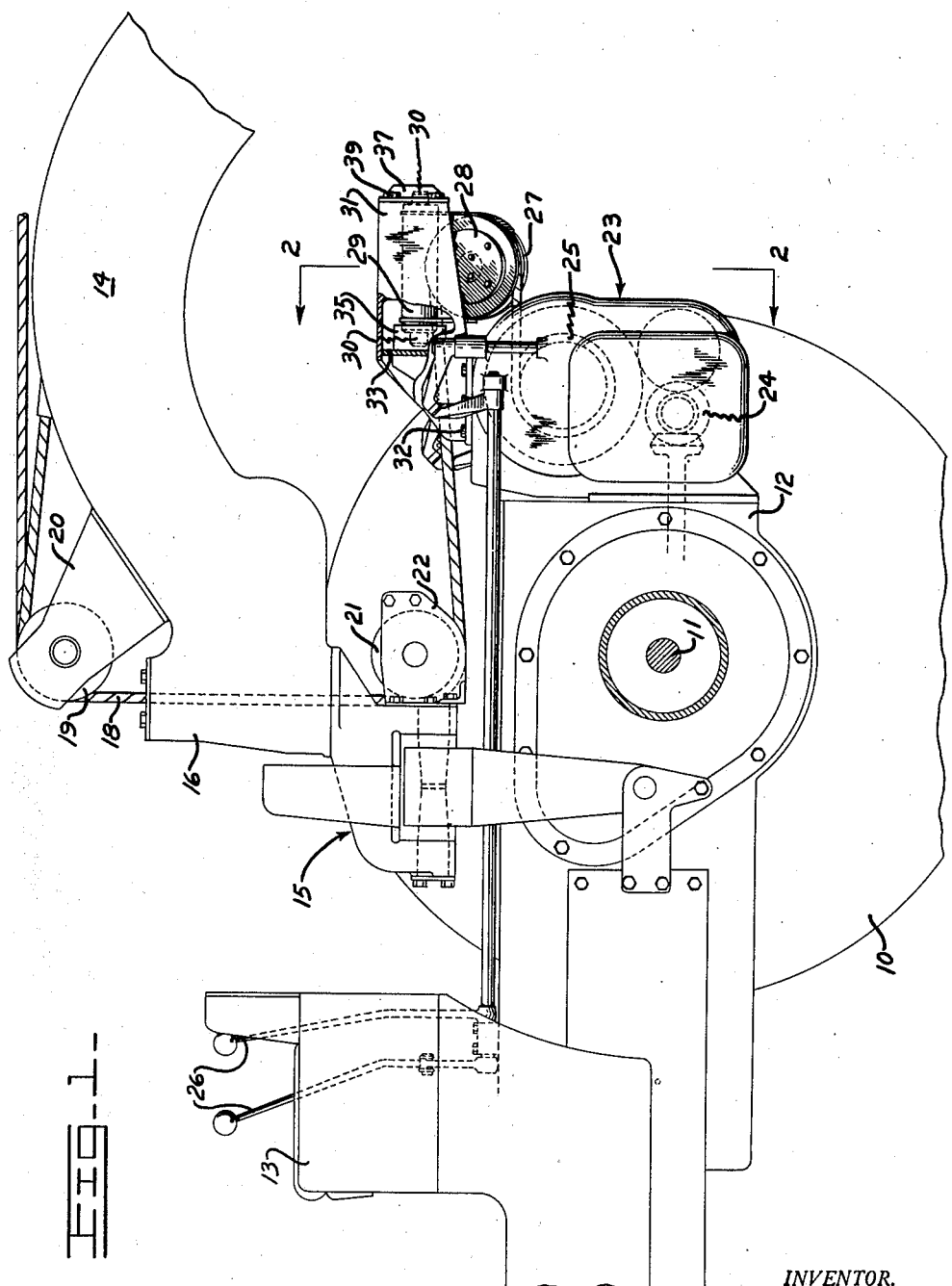
Fig. 1 is a view in side elevation of the rear end of a tractor and the draft connection of a trailer or the like being drawn thereby illustrating the application of the present invention to control cables which extend between the tractor and the trailer.
Figure 2:
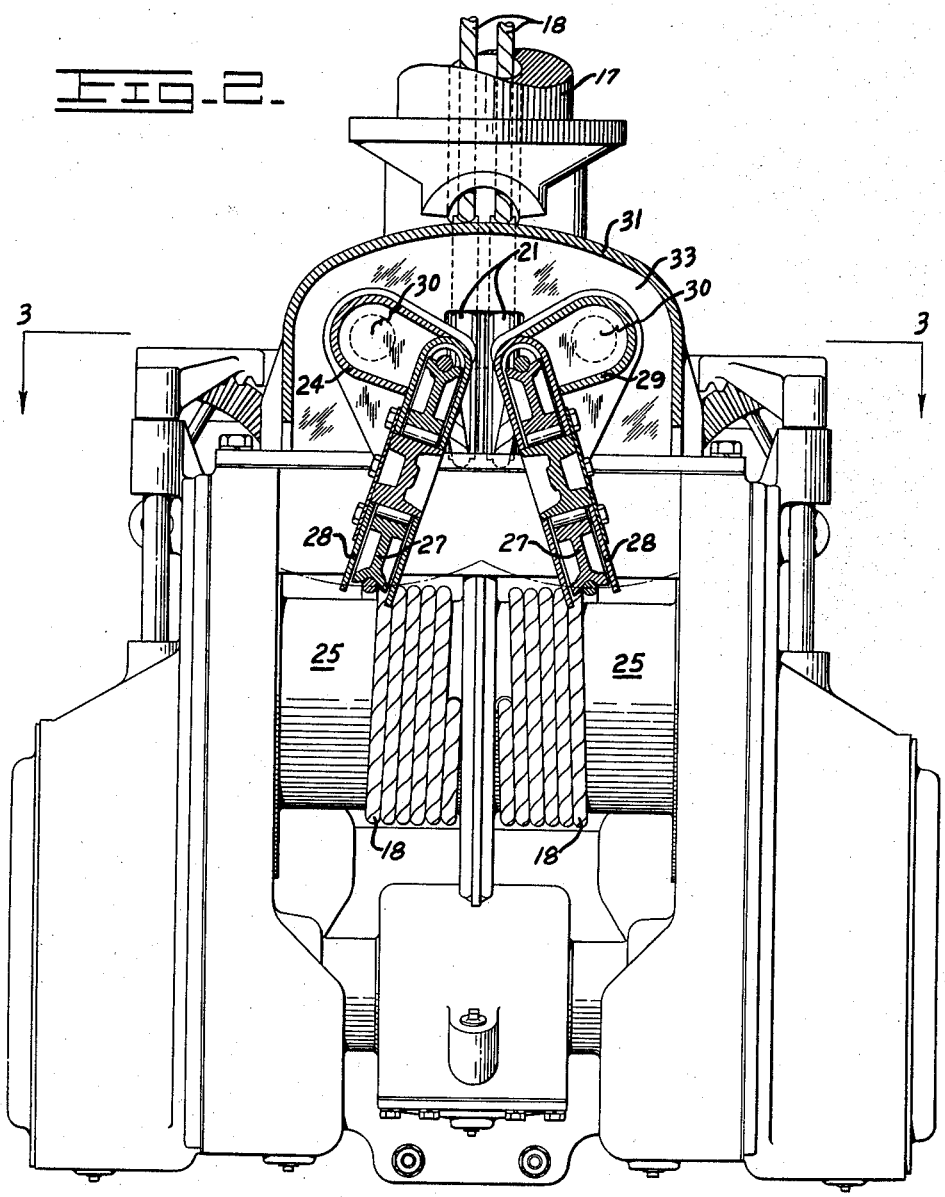
Fig. 2 is a sectional view taken on the line 2—2 of Fig. 1.

Referring first to Fig. 1 of the drawings, the rear end of a tractor is illustrated as supported on wheels, one of which is shown at 10, and which are supported on axles 11 projecting from a transmission case 12. The tractor operator's station is indicated at 13. A draft connection 14 of a trailer or similar implement is shown as connected with the rear end of the tractor by a hitch generally indicated at 15 which permits universal movement between the tractor and the trailer and which includes a vertically disposed pivotal member 16 which, as shown in Fig. 2, contains a hollow king bolt 17 through which control cables 18 pass. The details of construction of the hitch 15 are fully set forth in the application of Carl A. Gustafson for "Cable lead," Serial No. 600,615 filed January 20, 1945. In such application the control cables are disclosed as passing over closely spaced sheaves 19, supported in a bracket 20 on the draft connection 14, and as passing downwardly through the hollow king bolt 17, and then under closely spaced sheaves 21 supported in brackets 22. One of the purposes of the invention disclosed in said application is to permit free movement of the draft connection 14 about the king bolt 17 without disarranging the cables 18. The cables lead to a cable control unit generally indicated at 23, the construction of which is fully disclosed in an application of John E. Jass, entitled "Cable control unit," Serial No. 634,957, filed December 14, 1945. This cable control unit is secured to the transmission housing 12 from which a drive connection, indicated in dotted lines at 24, is taken for the operation of a pair of cable winding drums 25 individually controlled by levers 26 positioned for manipulation by the tractor operator in accordance with conventional practice. The cable winding drums 25 are, for reasons fully set forth in said application entitled "Cable control unit," closely spaced, as best shown in Fig. 2 of the drawings of the present application. Because of the fact that the cables 18 are closely spaced in passing through the king bolt 17 and are wound upon closely spaced drums, ordinary arrangements of cable laying sheaves for guiding the cables as they are wound upon the drums are impractical.

Figure 3:
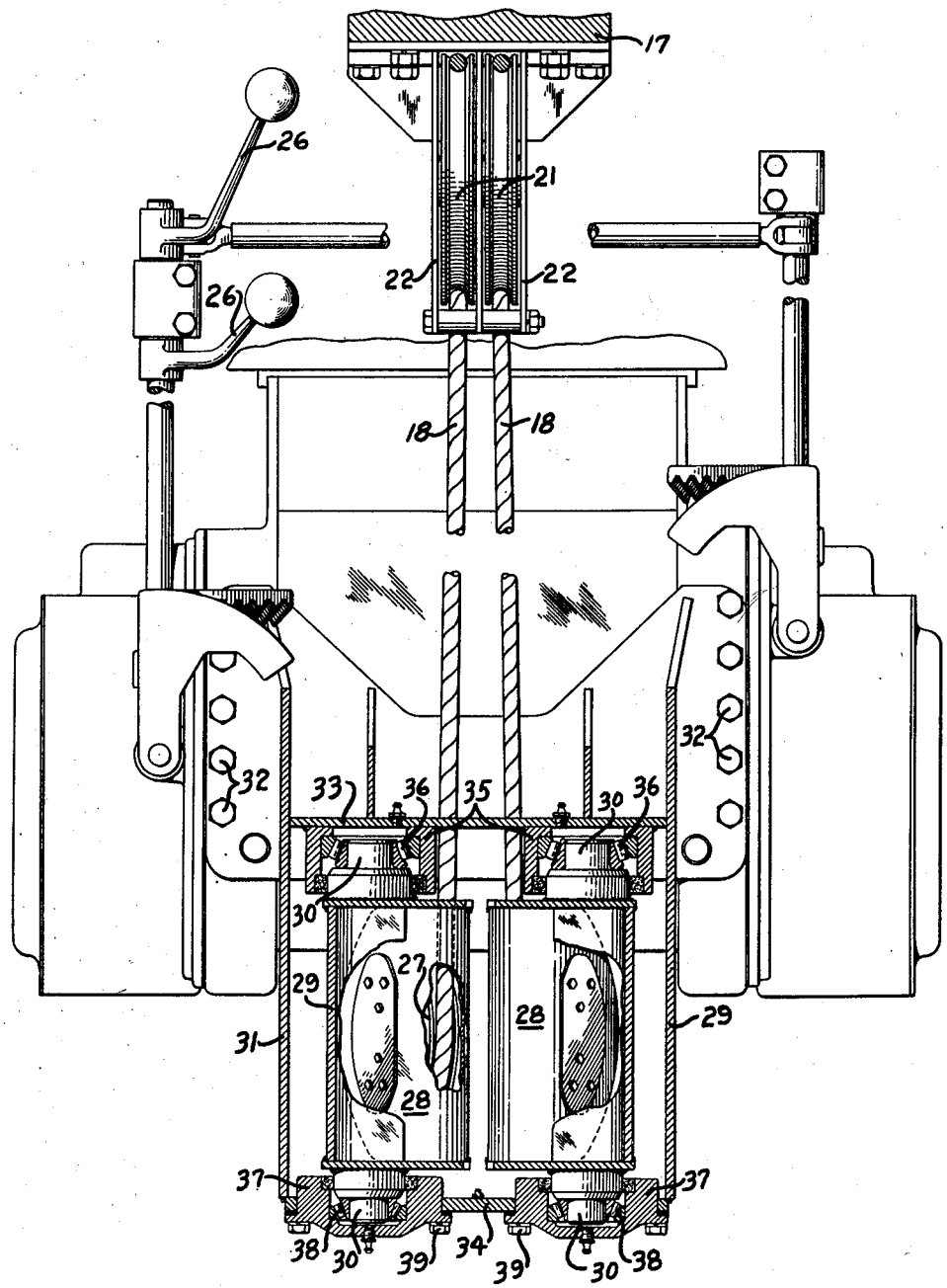
Fig. 3 is a sectional view taken on the line 3—3 of Fig. 2.

The present invention, therefore, provides an arrangement of cable laying sheaves particularly adapted to the guiding of closely spaced cables as they are wound up on a pair of closely spaced drums which rotate about a common axis. The cable laying sheaves of the present invention are shown at 27 as supported for rotation in conventional housings 28 provided with angularly disposed brackets 29 which, as best shown in Figs. 2 and 3, support trunnions 30 at their opposite ends.

A sheave supporting enclosure 31 is secured, as by cap screws 32, to the top of the cable control unit and comprises a pair of vertically disposed walls 33 and 34 between which the sheaves are supported. The wall 33 carries bearing housings 35 containing bearings 36 for the trunnions at one end of the sheaves and the walls 34 carry bearing housings 37 which enclose bearings 38 for the trunnions 30 at the opposite ends of the sheaves. Bearing housings 37 are removably retained in the wall 34 by cap screws 39 to enable the sheaves to be assembled in place within the housing 31.

Considering the guide plane of a sheave to be that central plane in which the cable is disposed as it passes over the sheave and which is disposed midway between and parallel to the two sides of the sheave housing 28, the trunnions 30 about which the sheaves pivot are, as viewed in Fig. 2, offset with relation to the guide planes of the sheaves 27. Consequently, each of the sheaves 27 is supported for pivotal or swinging movement about its trunnions 30 in such a manner that when the sheaves swing toward each other the opposed faces of their housings may assume closely spaced parallel relationship for guiding the closely spaced cables 18 onto the drums 25. Therefore, in the event the winding drums are controlled in such a manner that both of the sheaves 27 are swung inwardly toward each other at the same time, there will be no contact or interference between the sheaves or between their pivotal supports which are widely spaced even though the sheaves are operable in closely spaced parallel planes.

The use of conventional cable laying sheaves with the combination of closely spaced cables and winding drums herein disclosed would necessitate the use of an extra pair of sheaves interposed between the guide sheaves 21 and the cable laying sheaves 27 in order to spread the cables for reception by the cable laying sheaves. The present invention, therefore, not only eliminates the necessity of an additional pair of guide sheaves but provides cable laying sheaves which are rigidly supported and freely pivotable throughout the full range necessary to their proper function of guiding the cables as they are wound upon the drums.

I claim:

1. In combination with a pair of closely spaced cable winding drums and a pair of closely spaced cables to be wound upon said drums, a pair of cable laying sheaves associated with said drums and cables, and pivotal supports for said sheaves offset with relation to the guide plane of the sheaves to enable them to swing to and from a position of adjacent parallelism.

2. In combination with a pair of cable winding drums rotatable on a common axis with closely spaced adjacent ends, a pair of guide sheaves for laying cable on said drums, and individual pivotal supports for said sheaves offset with relation to the guide plane of the sheaves to enable them to swing to a position for laying cables on the adjacent ends of said drums.

3. In combination with a tractor and an implement drawn thereby, a pair of control cables leading from the implement to the tractor, a cable control unit on the tractor including a pair of cable winding drums disposed end to end on a common axis, a pair of cable laying sheaves adjacent said drums, and a pivotal support for each of said sheaves offset with relation to the guide plane of the sheaves.

4. In combination with a cable control unit which comprises a pair of closely spaced cable winding drums, a sheave supporting enclosure secured to said unit, and a pair of cable laying sheaves mounted for pivotal movement about bearings disposed within said enclosure, said bearings being offset with relation to the guide planes of the sheaves.

PAUL B. BENNER.

REFERENCES CITED

The following references are of record in the file of this patent:

UNITED STATES PATENTS

| Number | Name | Date |
|---|---|---|
| 728,823 | Adams | May 26, 1903 |
| 1,833,172 | Minor | Nov. 24, 1931 |
| 2,103,541 | Low | Dec. 28, 1937 |
| 2,216,263 | Clark | Oct. 1, 1940 |
| 2,272,917 | Lawler | Feb. 10, 1942 |
| 2,366,433 | Bridwell et al. | Jan. 2, 1945 |

FOREIGN PATENTS

| Number | Country | Date |
|---|---|---|
| 3,334 | Great Britain | of 1900 |